US012775574B2

United States Patent
(12) United States Patent
Awan et al.

(10) Patent No.: US 12,775,574 B2
(45) Date of Patent: Oct. 27, 2026

(54) DATA COMMUNICATION BETWEEN A HOST COMPUTER AND AN FPGA

(71) Applicant: Telefonaktiebolaget LM Ericsson (publ), Stockholm (SE)

(72) Inventors: Ahsan Javed Awan, Vallentuna (SE); Shaji Baig, Karachi (PK); Konstantinos Fertakis, Athens (GR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 73 days.

(21) Appl. No.: 17/798,373

(22) PCT Filed: Feb. 10, 2020

(86) PCT No.: PCT/SE2020/050127
§ 371 (c)(1),
(2) Date: Aug. 9, 2022

(87) PCT Pub. No.: WO2021/162591
PCT Pub. Date: Aug. 19, 2021

(65) Prior Publication Data
US 2023/0034178 A1 Feb. 2, 2023

(51) Int. Cl.
*G06F 13/42* (2006.01)
*G06F 9/50* (2006.01)

(52) U.S. Cl.
CPC .. *G06F 13/4221* (2013.01); *G06F 2213/0026* (2013.01)

(58) Field of Classification Search
CPC ............... G06F 9/5011; G06F 13/4221; G06F 2213/0026
(Continued)

(56) References Cited

U.S. PATENT DOCUMENTS 7,324,523 B2 * 1/2008 Dacosta .............. H04L 41/0896 370/468
9,423,864 B2 * 8/2016 Li ......................... G06F 1/3253
(Continued)

FOREIGN PATENT DOCUMENTS

CN 109032974 A 12/2018

OTHER PUBLICATIONS

Author Unknown, "Device Plugins," Kubernetes, Version 1.10, kubernetes.io/docs/concepts/extend-kubernetes/compute-storage-net/device-plugins/, last modified Dec. 20, 2019, The Linux Foundation, 9 pages.
(Continued)

*Primary Examiner* — Chun Kuan Lee
(74) *Attorney, Agent, or Firm* — Withrow & Terranova, PLLC

(57) ABSTRACT

There is provided mechanisms for data communication between applications of a host computer and partitions of resources of an FPGA. Each partition is configured to serve a respective one of the applications. The host computer is configured to run the applications. The method is performed by the host computer. The method comprises communicating, over a PCIe interface provided between the host computer and the FPGA, data between the applications and the partitions of resources. Each application is allocated its own configured share of bandwidth resources of the PCIe interface. All bandwidth resources of the PCIe interface are distributed between the applications according to all the configured shares of bandwidth resources when the data is communicated.

20 Claims, 7 Drawing Sheets

(58) Field of Classification Search
USPC ........................................................ 710/33
See application file for complete search history.

(56) References Cited

U.S. PATENT DOCUMENTS

| | | | | |
|---|---|---|---|---|
| 11,586,565 | B2 * | 2/2023 | Ballapuram | G06F 13/4068 |
| 2006/0168081 | A1 * | 7/2006 | Okada | H04L 67/62 709/207 |
| 2015/0347324 | A1 | 12/2015 | Tsuji et al. | |
| 2017/0123974 | A1 * | 5/2017 | Yi | G06F 3/0688 |
| 2019/0108145 | A1 | 4/2019 | Raghava et al. | |
| 2020/0008044 | A1 * | 1/2020 | Poornachandran | H04W 4/024 |
| 2020/0304426 | A1 * | 9/2020 | Zhao | H04L 12/66 |

OTHER PUBLICATIONS

Author Unknown, "Fast Partial Reconfiguration Over PCI Express," Application Note XAPP1338, Version 1.0, Mar. 11, 2019, Xilinx, Inc., 15 pages.
Chen, et al., "Enabling FPGAs in the Cloud," Computing Frontiers, May 2014, Cagliari, Italy, ACM, 10 pages.
Jacobsen, et al., "RIFFA 2.1: A Reusable Integration Framework for FPGA Accelerators," ACM Transactions on Reconfigurable Technology and Systems, vol. 8, Issue 4, Sep. 2015, 23 pages.
Sehgal, "Accelerating the Adoption of Hardware Accelerators in K8S," 2017, Intel Corporation, 11 pages.
Xu, Brian, "k8s-fpga-device-plugin," github.com/Xilinx/FPGA_as_a_Service/tree/master/k8s-fpga-device-plugin/trunk, last updated Feb. 21, 2020, 5 pages.
International Search Report and Written Opinion for International Patent Application No. PCT/SE2020/050127, mailed Nov. 2, 2020, 10 pages.
First Office Action for Chinese Patent Application No. 202080096167.6, mailed Jul. 26, 2024, 16 pages.
Second Office Action for Chinese Patent Application No. 202080096167.6, mailed Nov. 8, 2024, 20 pages.
Rejection Decision for Chinese Patent Application No. 202080096167.6, mailed Dec. 27, 2024, 23 pages.

* cited by examiner

DATA COMMUNICATION BETWEEN A HOST COMPUTER AND AN FPGA

This application is a 35 U.S.C. § 371 national phase filing of International Application No. PCT/SE2020/050127, filed Feb. 10, 2020, the disclosure of which is incorporated herein by reference in its entirety.

TECHNICAL FIELD

Embodiments presented herein relate to methods, a host computer, a field-programmable gate array (FPGA), computer programs, and a computer program product for data communication between applications of the host computer and partitions of resources of the FPGA.

BACKGROUND

In general terms, an FPGA is an integrated circuit designed to be configured for one or more applications, as run by a host computer, after manufacturing of the FPGA.

The FPGA configuration is generally specified using a hardware description language (HDL).

FPGAs comprise an array of programmable logic blocks, and a hierarchy of reconfigurable interconnects that allow the blocks to be wired together. Logic blocks can be configured to perform complex combinational functions, or merely implement the functionality of simple logic gates, such as logic AND gates and logic XOR gates. The logic blocks might further include memory elements, which may be simple flip-flops or more complete blocks of memory. FPGAs might be reprogrammed to implement different logic functions, allowing flexible reconfigurable computing as performed in computer software.

Dedicating one large FPGA to a single application might lead to poor utilization of the FPGA resources. Multi-tenancy on FPGAs should therefore be supported in a seamless manner so that, for example, multiple applications of the host computer that need hardware acceleration (as provided by the FPGA) are able to share the internal resources of the FPGA, any off-chip dynamic random access memory (DRAM) and the bandwidth of the interface between the host computer, or computers, and the FPGA. One examples of such an interface is the Peripheral Component Interconnect Express (PCIe) interface.

The internal resources of the FPGA might be shared among two or more applications by the resources being statically dived among multiple partitions, each of which can be dynamically re-configured with the bitstreams using partial reconfiguration technology. When an FPGA is partitioned into multiple regions, where each region defines its own partition of resources, and shared among multiple applications, the PCIe bandwidth and off-chip DRAM should also be shared between the multiple applications. Traditional device plugins do not support such functionality in a transparent manner. This makes it cumbersome to share the resources of an FPGA in an efficient manner.

Hence, there is still a need for an improved sharing of resource of an FPGA utilized by applications of a host application.

SUMMARY

An object of embodiments herein is to provide efficient data communication between applications of a host computer and partitions of resources of an FPGA, such that efficient sharing of resource of the FPGA is enabled.

According to a first aspect there is presented a method for data communication between applications of a host computer and partitions of resources of an FPGA. Each partition is configured to serve a respective one of the applications. The host computer is configured to run the applications. The method is performed by the host computer. The method comprises communicating, over a PCIe interface provided between the host computer and the FPGA, data between the applications and the partitions of resources. Each application is allocated its own configured share of bandwidth resources of the PCIe interface. All bandwidth resources of the PCIe interface are distributed between the applications according to all the configured shares of bandwidth resources when the data is communicated.

According to a second aspect there is presented a host computer for data communication between applications of the host computer and partitions of resources of an FPGA. Each partition is configured to serve a respective one of the applications. The host computer is configured to run the applications. The host computer comprises processing circuitry. The processing circuitry is configured to cause the host computer to communicate, over a PCIe interface provided between the host computer and the FPGA, data between the applications and the partitions of resources. Each application is allocated its own configured share of bandwidth resources of the PCIe interface. All bandwidth resources of the PCIe interface are distributed between the applications according to all the configured shares of bandwidth resources when the data is communicated.

According to a third aspect there is presented a host computer for data communication between applications of the host computer and partitions of resources of an FPGA. Each partition is configured to serve a respective one of the applications. The host computer is configured to run the applications. The host computer comprises a communicate module configured to communicate, over a PCIe interface provided between the host computer and the FPGA, data between the applications and the partitions of resources. Each application is allocated its own configured share of bandwidth resources of the PCIe interface. All bandwidth resources of the PCIe interface are distributed between the applications according to all the configured shares of bandwidth resources when the data is communicated.

According to a fourth aspect there is presented a computer program for data communication between applications of the host computer and partitions of resources of an FPGA. The computer program comprises computer program code which, when run on processing circuitry of the host computer, causes the host computer to perform a method according to the first aspect.

According to a fifth aspect there is presented a method for data communication between partitions of resources of an FPGA and applications of a host computer. Each partition is configured to serve a respective one of the applications. The host computer is configured to run the applications. The method is performed by the FPGA. The method comprises communicating, over a PCIe interface provided between the FPGA and the host computer, data between the applications and the partitions of resources. Each application is allocated its own configured share of bandwidth resources of the PCIe interface. All bandwidth resources of the PCIe interface are distributed between the applications according to all the configured shares of bandwidth resources when the data is communicated.

According to a sixth aspect there is presented an FPGA for data communication between partitions of resources of the FPGA and applications of a host computer. Each partition is configured to serve a respective one of the applications. The host computer is configured to run the applications. The FPGA comprises processing circuitry. The processing circuitry is configured to cause the FPGA to communicate, over a PCIe interface provided between the FPGA and the host computer, data between the applications and the partitions of resources. Each application is allocated its own configured share of bandwidth resources of the PCIe interface. All bandwidth resources of the PCIe interface are distributed between the applications according to all the configured shares of bandwidth resources when the data is communicated.

According to a sevenths aspect there is presented an FPGA for data communication between partitions of resources of the FPGA and applications of a host computer. Each partition is configured to serve a respective one of the applications. The host computer is configured to run the applications. The FPGA comprises a communicate module configured to communicate, over a PCIe interface provided between the FPGA and the host computer, data between the applications and the partitions of resources. Each application is allocated its own configured share of bandwidth resources of the PCIe interface. All bandwidth resources of the PCIe interface are distributed between the applications according to all the configured shares of bandwidth resources when the data is communicated.

According to an eight aspect there is presented a computer program for data communication between partitions of resources of an FPGA and applications of a host computer, the computer program comprising computer program code which, when run on processing circuitry of the FPGA, causes the FPGA to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these aspects enable efficient data communication between applications of the host computer and partitions of resources of the FPGA.

Advantageously these aspects provide efficient sharing of resource of the FPGA.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
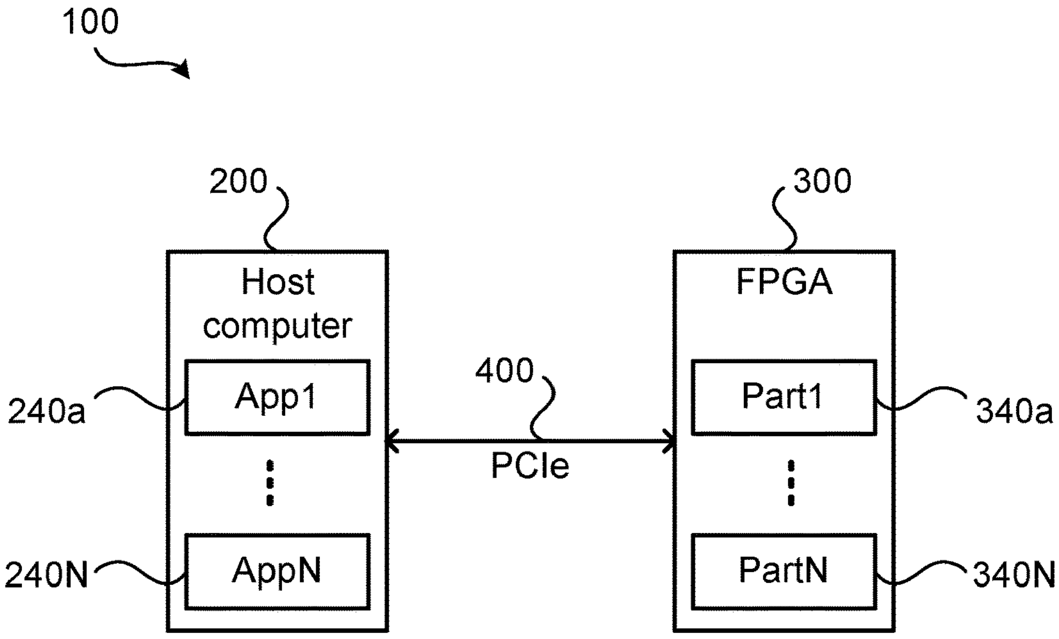
FIGS. 1 and 2 are schematic diagrams illustrating a system comprising a host computer and an FPGA according to embodiments.

FIG. 1 is a schematic diagram illustrating a system 100 where embodiments presented herein can be applied. The system 100 comprises a host computer 200 and an FPGA 300. The host computer 200 and the FPGA 300 are configured to communicate with each other over a PCIe interface 400. The host computer 200 is configured to run applications 240*a*:240N, denoted App1:AppN in FIG. 1. The FPGA 300 is configured to have its resources partitioned into partitions 340*a*:340N, denoted Part1:PartN in FIG. 1. Each partition 340*a*:340N of resources of the FPGA 300 is configured to serve a respective one of the applications 240*a*:240N.

As noted above there is a need for improved sharing of partition 340*a*:340N of resources of the FPGA 300 that is utilized by applications 240*a*:240N of a host application 200.

The embodiments disclosed herein therefore relate to mechanisms for data communication between applications 240*a*:240N of the host computer 200 and partitions 340*a*:340N of resources of an FPGA 300 and data communication between partitions 340*a*:340N of resources of the FPGA 300 and applications 240*a*:240N of a host computer 200. In order to obtain such mechanisms there is provided a host computer 200, a method performed by the host computer 200, a computer program product comprising code, for example in the form of a computer program, that when run on processing circuitry of the host computer 200, causes the host computer 200 to perform the method. In order to obtain such mechanisms there is further provided an FPGA 300, a method performed by the FPGA 300, and a computer program product comprising code, for example in the form of a computer program (for example provided as a hardware description language (HDL) program), that when run on processing circuitry configured on the programmable logic of the FPGA 300, causes the FPGA 300 to perform the method.

Figure 2:
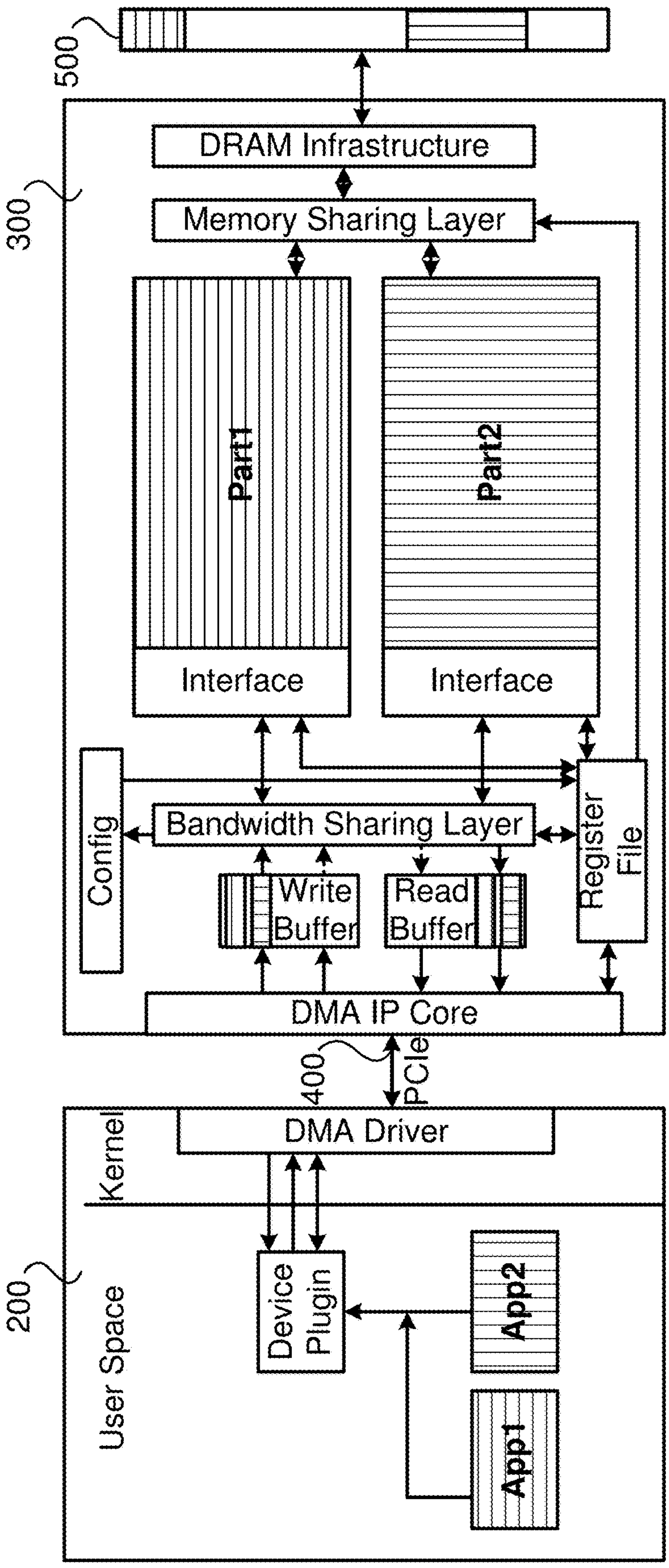

FIG. 2 is a schematic diagram illustrating the host computer 200 and the FPGA 300 in further detail. The host computer 200 and the FPGA 300 are configured to communicate with each other over a PCIe interface 400. The FPGA 300 is operatively connected to a DRAM 500. The host computer 200 is divided into two parts; a user space part and a Kernel part. In turn the Kernel part comprises a Direct Memory Access (DMA) driver for communication over the PCIe interface 400. The user space part comprises at least one device plugin module for enabling applications run by the host computer 200 to communicate with the DMA driver for data transfer. In the schematic example of FIG. 2, the host computer 200 is configured to run two applications; App1 and App2, and the FPGA 300 comprises two corresponding partitions; Part1 and Part2 (which might be reconfigured dynamically using partial reconfiguration capabilities of a configuration module in the FPGA 300). The FPGA 300 further comprises a DMA Intellectual Property (IP) Core for communication over the PCIe interface 400. The partitions Part1 and Part2 have interfaces that are operatively connected to the DMA IP Core via a double buffer provided in terms of a read double buffer and a write double buffer. Data to be read/written from/to these buffers is handled by a bandwidth sharing layer that operates according to information in a register file, and communicates with the partitions Part1 and Part2 and the configuration module. Further, the partitions Part1 and Part2 are operatively connected to a memory sharing layer that in turn is operatively connected to a DRAM infrastructure for storing data in the DRAM 500.

As an illustrative example, during configuration, or partial reconfiguration, of the FPGA 300, the host computer 200 translates its PCIe bandwidth requirements into read/write offsets with in a fixed size PCIe transaction. These offsets are written to the register file which maintains the offsets for each partially reconfigurable partition and also for the configuration module inside the FPGA 300. To saturate the PCIe bandwidth, the host computer 200 converts the fixed size transaction into multiple DMA requests that are instantiated in parallel across multiple DMA channels via an out-of-order memory mapped interface. A double buffer is used to reorder the data in the FPGA 300 at reduced latency. The bandwidth sharing layer look up the per partition offsets from the register file, reads the corresponding part of the PCIe transaction from the double buffer and distribute the data to the individual partitions.

Figure 3:
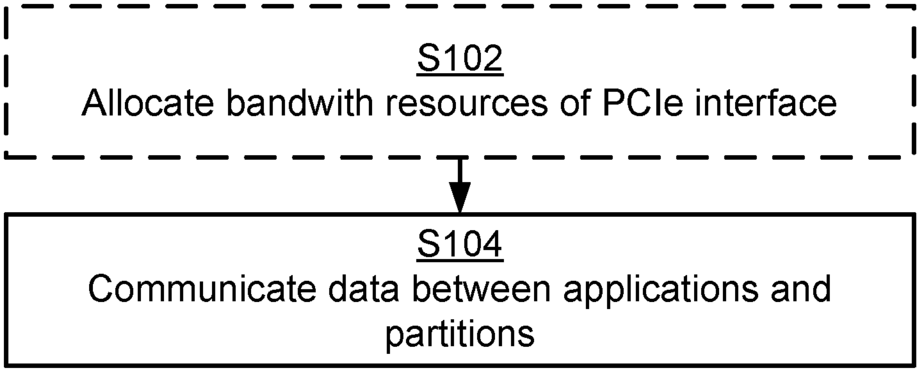
FIGS. 3, 4, 5, and 6 are flowcharts of methods according to embodiments.

Reference is now made to FIG. 3 illustrating a method for data communication between applications 240*a*:240N of the host computer 200 and partitions 340*a*:340N of resources of the FPGA 300 as performed by the host computer 200 according to an embodiment. Continued parallel reference is made to FIG. 1.

S104: The host computer 200 communicates, over the PCIe interface 400 provided between the host computer 200 and the FPGA 300, data between the applications 240*a*:240N and the partitions 340*a*:340N of resources. Each application is allocated its own configured share of bandwidth resources of the PCIe interface 400. All bandwidth resources of the PCIe interface 400 are distributed between the applications 240*a*:240N according to all the configured shares of bandwidth resources when the data is communicated.

The partitions 340*a*:340N of resources operate independently of each other whilst ensuring the allocated bandwidth amongst all data transaction and data isolation between the partitions 340*a*:340N of the FPGA 300.

Embodiments relating to further details of data communication between applications 240*a*:240N of the host computer 200 and partitions 340*a*:340N of resources of the FPGA 300 as performed by the host computer 200 will now be disclosed.

In some aspects, the applications 240*a*:240N are allocated a predefined amount of bandwidth to their allocated partitions 340*a*:340N of resources that corresponds to the specifications of the accelerator that they have selected to configure and execute. Hence, according to an embodiment, the host computer 200 is configured to perform (optional) step S102:

S102: The host computer 200 allocates the bandwidth resources of the PCIe interface 400 to the applications 240*a*:240N according to the configured shares of bandwidth resources before the data is communicated.

This bandwidth might be preserved in between subsequent data transfer transactions between the host computer 200 and the FPGA 300. However, this bandwidth might be dynamically altered and be redefined. Further, the applications 240*a*:240N might have separate bandwidth configurations for read operations and write operations, respectively, for their accelerator.

Data might be communicated in the direction from the host computer 200 to the FPGA, or in the reversed direction. Thus, according to an embodiment, the data, per each data transfer cycle, is either communicated from the host computer 200 to the FPGA 300 or from the FPGA 300 to the host computer 200.

In some aspects, the transaction size is fixed. Thus, according to an embodiment, one fixed-size PCIe data transaction is communicated per each data transfer cycle. It might thereby be known in advance how many bytes of data are going to be transferred in one transaction across the PCIe interface 400.

In some aspects, the PCIe bandwidth requirements are translated to read/write offsets within a fixed-size PCIe data transaction. In some aspects, all bandwidth resources of the PCIe interface 400, per data transfer cycle, collectively define the fixed-size PCIe data transaction. According to an embodiment, each configured share of bandwidth resources is then by the host computer 200 translated to read/write offsets within the fixed-size PCIe data transaction.

The read/write offsets might be communicated to FPGA 300 to be written in a register file at the FPGA 300. That is, according to an embodiment, the read/write offsets are communicated from the host computer 200 to the FPGA 300.

In some aspects, a fixed-size data transaction over the PCIe interface 400 is converted into multiple direct memory access (DMA) requests. That is, according to an embodiment, communicating the data, between the host computer 200 and the FPGA 300, comprises converting one fixed-size PCIe data transaction per each data transfer cycle into at least two DMA requests.

In some aspects, the PCIe interface 400 is composed of DMA channels. Then, according to an embodiment, there are then at least as many DMA requests as there are DMA channels.

In some aspects, DMA requests are instantiated in parallel across all DMA channels. Particularly, according to an embodiment, the at least two direct memory access requests are instantiated in parallel across all the direct memory access channels, and the data is distributed among the direct memory access channels according to the configured shares of bandwidth resources.

Assuming that there are four DMA channels and the data transaction size per such channel is fixed to 64 KB, 256 KB will thus be transferred in each set of data transactions. In other words, 256 KB consumes 100% of the bandwidth of the PCIe interface 400. That is, in order to allocate X % of the of the bandwidth of the PCIe interface 400 to a certain application 240*a*:240N, X % of a 256 KB data set should correspond to that application. In this way, an average bandwidth allocation can be guaranteed to each application 240*a*:240N.

In some aspects, the bandwidth resources of the PCIe interface 400 are given in units of 32 bytes per data transfer cycle. According to an embodiment, each configured share of bandwidth resources of the PCIe interface 400 is then given as a multiple of 32 bytes. This could be the case for example where the data width on the FPGA side for its AXI-MM interface (i.e., the Advanced eXtensible Interface-Memory Mapped interface, e.g., between the DMA IP Core and the Read buffer and Write buffer, respectively, shown in FIG. 2) is 256 bits (corresponding to 32 bytes) and thus each data transfer per cycle should be equal to 32 bytes. However, in other examples the data width is different and thus the bandwidth resources of the PCIe interface 400 might be given in units of more than or less than 32 bytes per data transfer cycle. As the skilled person understands, if a wider AXI-MM interface is used, this number can be scaled accordingly.

Figure 4:
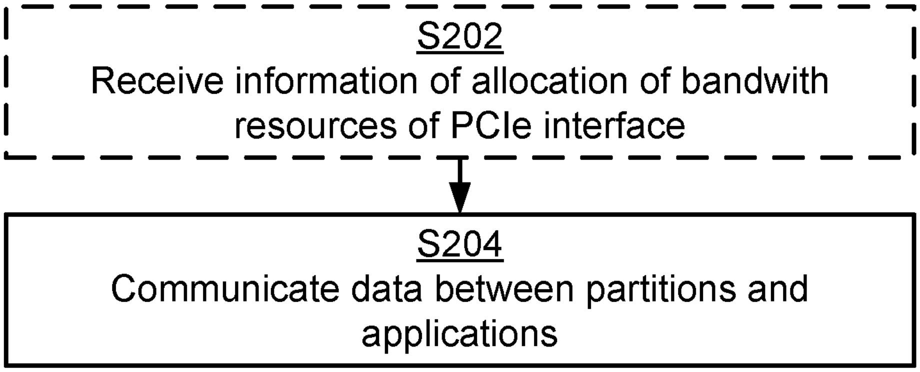

Reference is now made to FIG. 4 illustrating a method for data communication between partitions 340*a*:340N of resources of the FPGA 300 and applications 240*a*:240N of the host computer 200 as performed by the FPGA 300 according to an embodiment. Continued parallel reference is made to FIG. 1.

S204: The FPGA 300 communicates, over the PCIe interface 400 provided between the FPGA 300 and the host computer 200, data between the applications 240*a*:240N and the partitions 340*a*:340N of resources. As disclosed above, each application is allocated its own configured share of bandwidth resources of the PCIe interface 400. As further disclosed above, all bandwidth resources of the PCIe interface 400 are distributed between the applications 240*a*:240N according to all the configured shares of bandwidth resources when the data is communicated.

Embodiments relating to further details of data communication between partitions 340*a*:340N of resources of the FPGA 300 and applications 240*a*:240N of the host computer 200 as performed by the FPGA 300 will now be disclosed.

As disclosed above, according to an embodiment, the data, per each data transfer cycle, is either communicated from the host computer 200 to the FPGA 300 or from the FPGA 300 to the host computer 200.

As disclosed above, according to an embodiment, one fixed-size PCIe data transaction is communicated per each data transfer cycle.

As disclosed above, in some aspects, all bandwidth resources of the PCIe interface 400, per data transfer cycle, collectively define the fixed-size PCIe data transaction, and according to an embodiment each configured share of bandwidth resources corresponds to read/write offsets within the fixed-size PCIe data transaction.

As disclosed above, according to an embodiment, the read/write offsets are communicated to the FPGA 300 from the host computer 200. The read/write offsets might then be written by the FPGA 300 in a register file.

Based on the values written in the register file the relevant data is forwarded to the associated partition 340*a*:340N of resources. That is, according to an embodiment, for data communicated from the host computer 200 to the FPGA 300, the data is distributed to the partitions 340*a*:340N according to the read/write offsets in the register file.

In some aspects, a double buffer is used to reorder data (for both received data and data to be transmitted). Thus, according to an embodiment, the FPGA 300 comprises a double buffer and the data is reordered in a double buffer. In this respect, although the data sent through each DMA channel appears in order, in interleaved bursts, the data across different DMA channels might appear in out-of-order fashion. Therefore, according to an embodiment, for data communicated from the host computer 200 to the FPGA 300, the data is reordered according to the write offsets in the register file before being distributed to the partitions 340*a*:340N.

Further, according to an embodiment, for data communicated from the FPGA 300 to the host computer 200, the data is reordered according to the read offsets in the register file before being communicated from the FPGA 300 to the host computer 200. Double buffering (also known as ping-pong buffering) might be used for both read and write paths. For double buffering, a buffer twice the data set size is used. When one interface to the buffer is reading/writing from one half of the buffer, the other interface to the buffer is reading/writing from the other half of the buffer. The data re-ordering is thereby resolved by assigning data offset to the DMA channels in multiples of the transaction size. As an example, the first DMA channel reads/writes at an offset of 'o', whilst the second DMA channel reads/writes at an offset of '64K' and so on. In this way even if the data of second DMA channel appears on the AXI-MM interface before the data of the first DMA channel, the data of second DMA channel will be buffered at an address offset of 64K and onwards so that when reading from the other buffer-half is made, the data will be read in the correct order.

As disclosed above, in some aspects, the bandwidth resources of the PCIe interface 400 are given in units of 32 bytes per data transfer cycle, and according to an embodiment each configured share of bandwidth resources of the PCIe interface 400 is given as a multiple of 32 bytes.

As disclosed above, in some aspects, the applications 240*a*:240N are allocated a predefined amount of bandwidth to their allocated partitions 340*a*:340N of resources. This information is then provided to the FPGA 300. In particular, according to an embodiment the FPGA 300 is configured to perform (optional) step S202 for data communicated from the FPGA 300 to the host computer 200:

S202: The FPGA 300 receives information of allocation of the bandwidth resources of the PCIe interface 400 to the applications 240*a*:240N according to the configured shares of bandwidth resources before the data is communicated.

Figure 5:
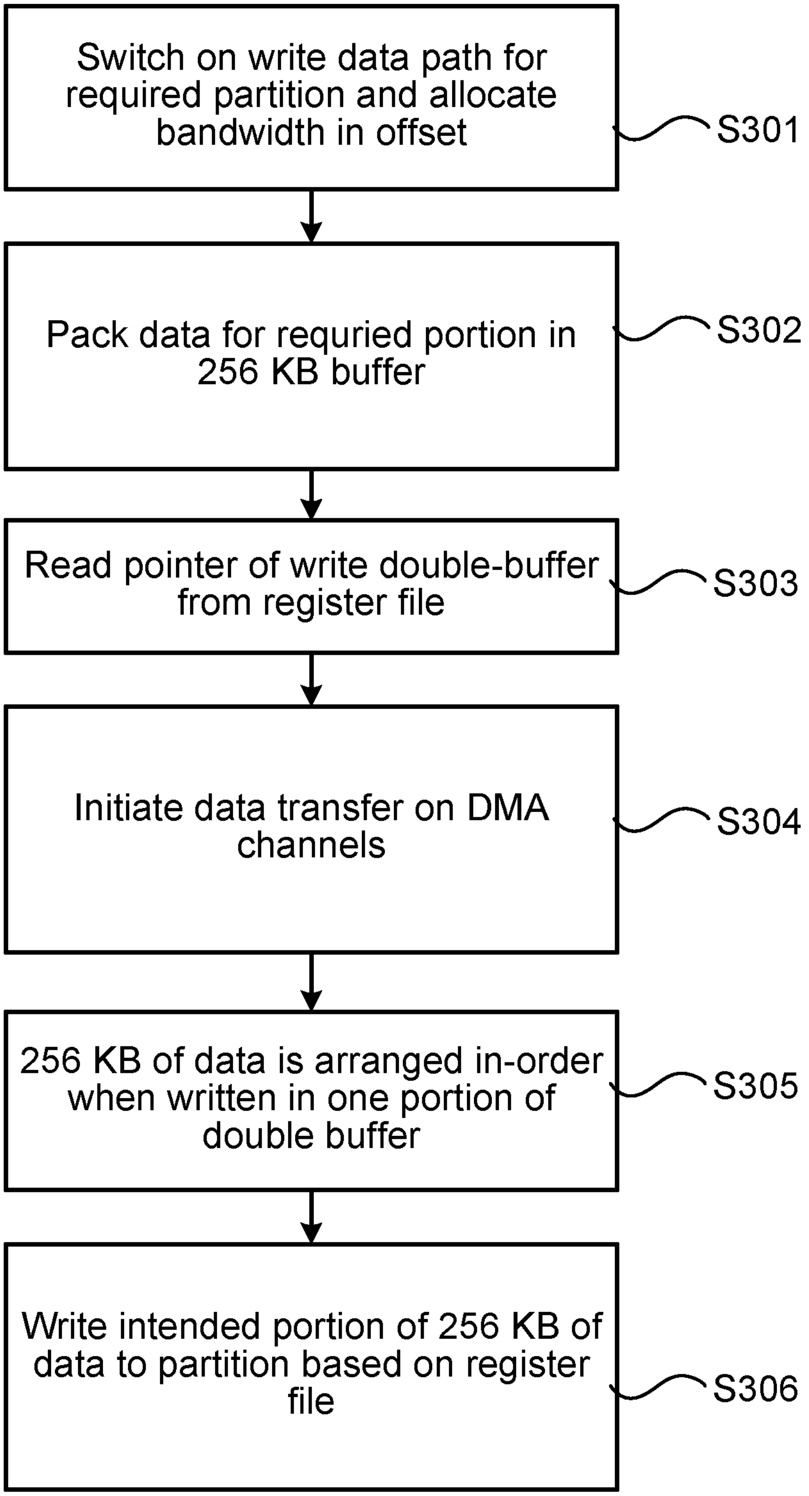

Reference is made to FIG. 5 illustrating a flowchart of a method for data transfer from applications 240*a*:240N of the host computer 200 to partitions 340*a*:340N of resources of the FPGA 300 according to an embodiment.

S301: The write path for the partition to which the data is to be transferred is switched on. Bandwidth is allocated in offsets of 32 bytes by corresponding write offset registers being written to.

S302: The data for the partition is packed in a 256 KB buffer that will be distributed in chunks of 64 KB to each of 4 DMA channels according to offsets of S301.

S303: The pointer of the write double buffer is read from the register file.

S304: A data transfer of 64 KB is initiated in parallel on all four DMA channels for the 256 KB buffer and address corresponding to the previously read write double buffer pointer plus address offsets of 64 KB for each DMA channel.

S305: 256 KB of the data is received out-of-order but is rearranged to be in-order when written to one portion of the double buffer due to the associated address.

S306: The intended portion of the 256 KB of data is written to the partition based on the register file. The Bandwidth Sharing Layer looks up, from the register file, the portion of the double buffer reserved for a particular partition and fetches the data from that specific portion and writes it to that particular partition.

Figure 6:
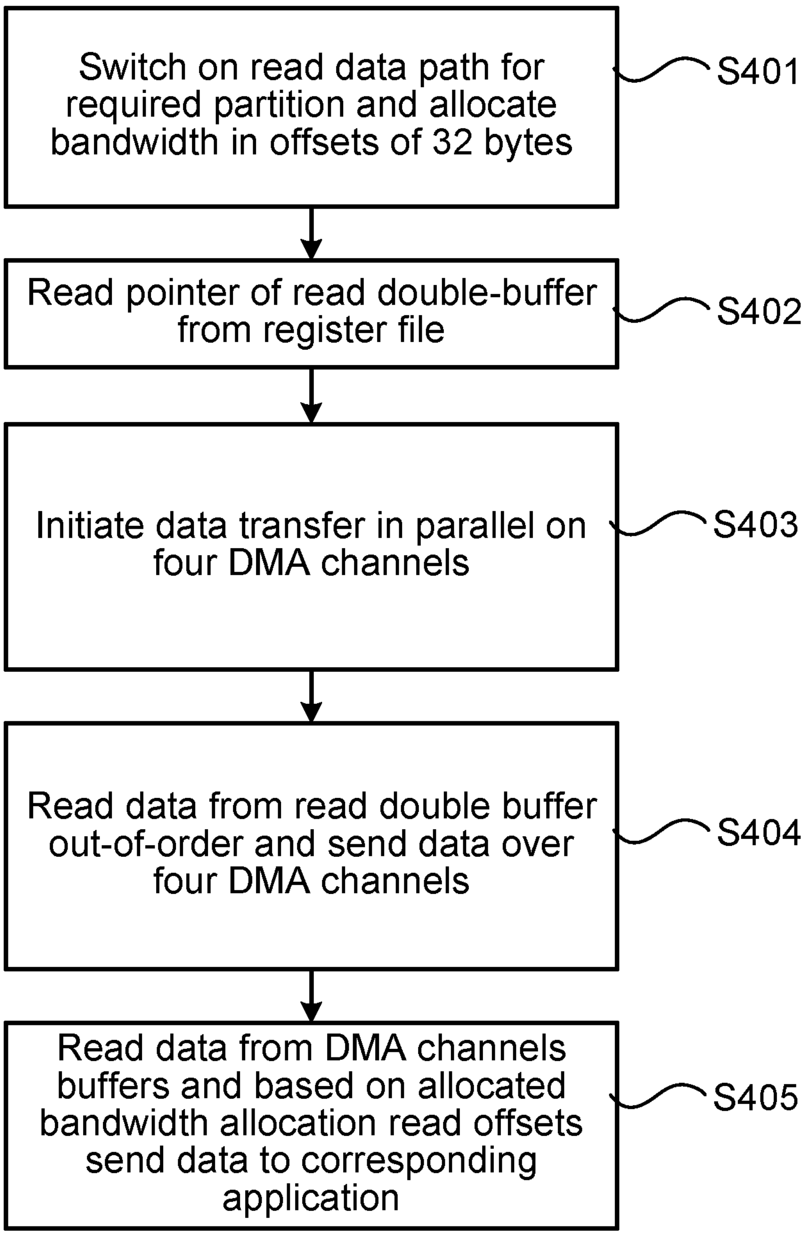

Reference is made to FIG. 6 illustrating a flowchart of a method for data transfer from partitions 340*a*:340N of resources of the FPGA 300 to applications 240*a*:240N of the host computer 200 according to an embodiment.

S401: The read path for the partition from which the data is to be transferred is switched on. Bandwidth is allocated in offsets of 32 bytes by corresponding read offset registers being written.

S402: The pointer of the read double buffer is read from the register file.

S403: A data transfer of 64 KB is initiated in parallel on all four DMA channels for the 256 KB buffer and address corresponding to the previously read double buffer pointer plus address offsets of 64 KB for each DMA channel.

S404: The corresponding 256 KB portion of the read double buffer is read out-of-order and sent in parallel over the four DMA channels. On the host computer side the data appears in the same order as it was in the read double buffer distributed across the four DMA channel buffers. While one half of the read double buffer is being read, the Bandwidth Sharing Layer packs the data from the required partition in the other half of the read double buffer.

S405: The data is read from all four DMA channel buffers and based on the read offsets the data is sent to the corresponding application.

As a non-limiting and illustrative example, assume that there are two applications, App1 and APP2 of the host computer 200 that are to send data to their corresponding partitions Part1 and Part2 in the FPGA 300. App1 is allocated 75% of the bandwidth of the PCIe interface 400 and App2 is allocated the remaining 25%. Depending on these allocations, the following values are written to the 'bandwidth allocation read/write' registers:

Part1: Write start offset: 0
Part1: Write End offset: 6143
Part1: Read Start Offset: 0
Part1: Read End Offset: 6143
Part2: Write Start Offset: 6144
Part2: Write End Offset: 8191
Part2: Read Start Offset: 6144
Part2: Read End Offset: 8191

Furthermore, assume that the data to be sent by App1 is stored in file app1.dat and data to be sent by App2 is stored in file app2.dat. To initiate the DMA transactions, the function "dma_to_device_with_offset" is used with the following function arguments:

d: specifies the DMA channel,
f: specifies the file from which the data has to be sent,
s: specifies the DMA transaction size,
c: specifies how many times the function should be executed with the given set of arguments,
t: specifies the starting point in the file from where the data should be sent.

Based on the parameters the function is invoked in parallel for all four DMA channels with proper arguments as:

./dma_to_device_with_offset -d/dev/xdmao_h2c_o -f app1.dat -s 65536-a 0-c 1-t 0
./dma_to_device_with_offset -d/dev/xdmao_h2c_1-f app1.dat -s 65536-a 65536-c 1-t 65536
./dma_to_device_with_offset -d/dev/xdmao_h2c_2-f app2.dat -s 65536-a 121072-c 1-t 121072
./dma_to_device_with_offset -d/dev/xdmao_h2c_3-f app2.dat -s 65536-a 196608-c 1-t 0

The '-a' argument is specified assuming that the write buffer pointer reads '0'. Otherwise, if the write buffer pointer reads '1' then the argument '-a' should be 262144, 327680, 393216 and 458752 for ch0, ch1, ch2 and ch3, respectively, that is with an offset of 256K. The FPGA 300 then starts to read sequentially from the top portion in words of 256 bits. To read the whole 256 KB thus takes 8192 reads. Based on the allocated values, the data from reads 0 to 6143 will go to Part1 and data from reads 6144 to 8191 will go to Part2.

Figure 7:
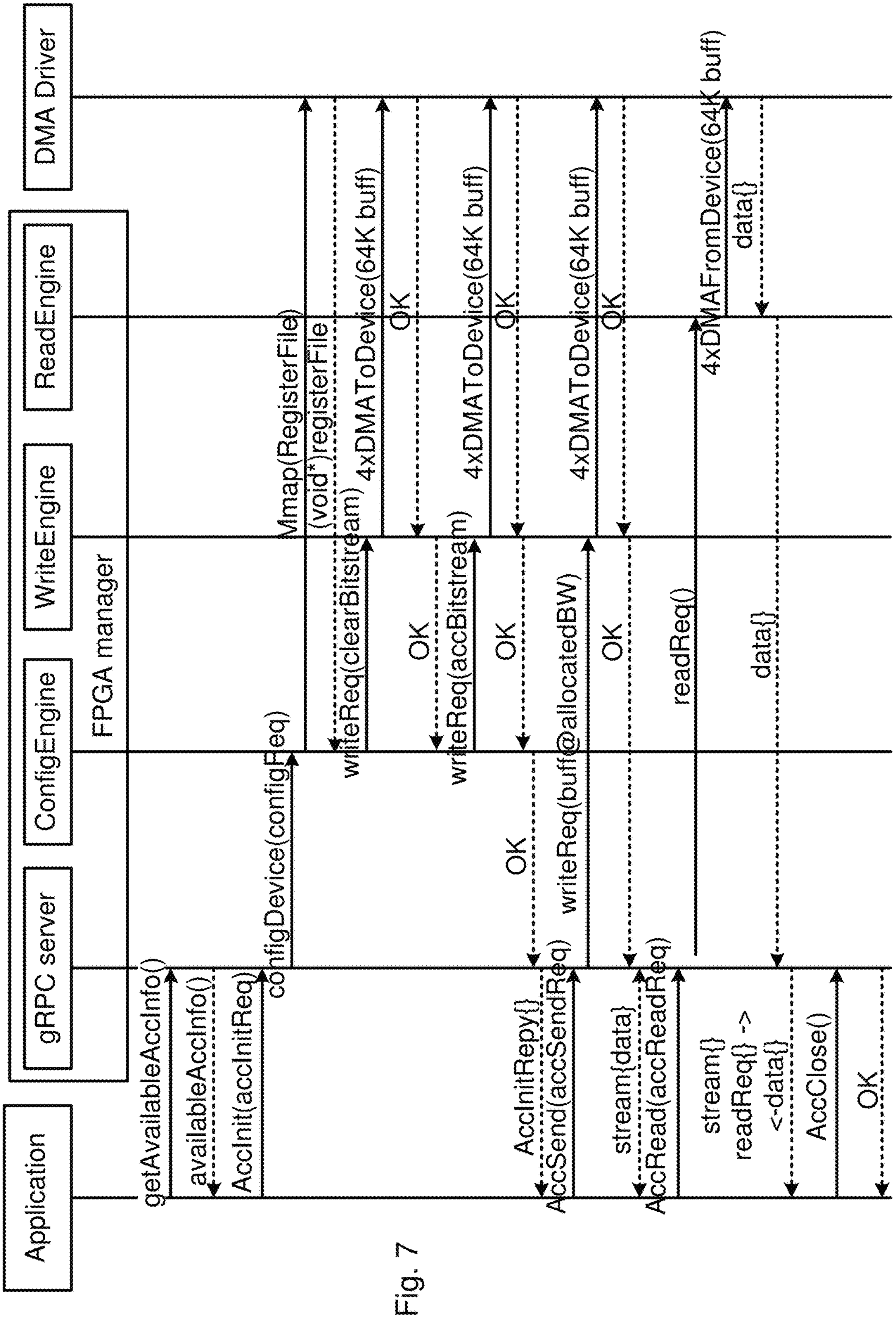
FIG. 7 is a signalling diagram of a method according to an embodiment.

One particular embodiment based on at least some of the above disclosed embodiments as performed by the host computer 200 will now be disclosed in detail with reference to the signalling diagram of FIG. 7. The host computer 200 runs an application and further comprises an FPGA manager and an DMA driver. With respect to FIG. 2, the FPGA manager might be comprised in the device plugin module. The FPGA manager comprises an gRPC server, a ConfigEngine, a WriteEngine, and a ReadEngine. The gRPC server is configured to listen for any incoming connection from applications 240*a*:240N. The ConfigEngine is configured to perform reconfiguration operations to the allocated partitions 340*a*:340N of resources of the FPGA 300. The WriteEngine is configured to serve transfer requests for sending data to the FPGA 300. The ReadEngine is configured to serve data transfer requests from the host computer 200 for receiving data from the FPGA 300.

By means of message getAvailableAccInfo( ) the host computer 200 requests information about available Accelerator bitstreams from the gRPC. By means of message availableAccInfo( ) the gRPC responds with the list of available Accelerator bitstreams to the host computer 200.

By means of message AccInit(accInitReq) the host computer 200 requests to configure a partition with an Accelerator bitstream from the gRPC. By means of message configDevice(configReq) the gRPC requests the ConfigEngine to perform a reconfiguration operation of the allocated partition. By means of message Mmap(RegisterFile) the ConfigEngine requests the DMA driver to map the Register File memory in the virtual address space of process running ConfigEngine. This enables the ConfigEngine to configure read/write offsets. The DMA driver response with a (void*)registerFile message. A clearing bitstream is sent to the partition by dividing it in chunks of a size equal to the bandwidth reserved for configuration. For each chunk to be transferred, the ConfigEngine requests the WriteEngine by means of message writeReq(clearBitsream). Once the clear bitstream is written to the partition, the WriteEngine replies to the ConfigEngine with an OK message. The ConfigEngine, by means of message writeReq(accBitstream), repeats the same procedure for transferring the Accelerator bitstream. Once the configuration process is done, the ConfigEngine sends an OK message to the gRPC, which in turn informs the host computer 200 about successful configuration via message AccIntReply( ).

By means of message AccSend(accSendReq), the host computer 200 requests from the gRPC to transfer data from the host computer 200 to the FPGA 300. The gRPC forwards the incoming request to the WriteEngine by means of message writeReq(buff@allocatedBW), upon which it fills the data provided over the streaming channel "stream{data}" into the portion of a 256 KB buffer that corresponds to its allocated bandwidth. Furthermore, if more requests, e.g. from other applications are waiting for the channel whilst the transfer preparation procedure has begun, the WriteEngine accepts them and fills the corresponding portions of the 256 KB buffer. Hence, in this way data transfer multiplexing from multiple applications into the same DMA transaction is achieved. Four independent DMA-To-Device transfers are then initiated, where 64 KB chunks of the original 256 KB buffer are transmitted in each transfer. Once the data transfer is complete, the WriteEngine notifies the gRPC with an OK message, which in turn notifies the host computer 200 with message AccSendReply.

By means of message AccRead(accReadReq), the host computer 200 requests from the gRPC to transfer data from the specific accelerator in the FPGA to the host computer message. The gRPC forwards the incoming request to the ReadEngine, which initiates a DMA transaction preparation process. During this process the ReadEngine notes all the accelerators that want to participate at that moment in the DMA transaction. By doing so, multiplexing of data transfers from the device for multiple applications into the same DMA transaction is achieved. Next the ReadEngine initiates four DMA-From-Device transfers by assigning 64 KB chunks of the original 256 KB buffer. Each transfer reads the contents from its buffer portion independently of each other and concurrently with respect to each other. Next the gRPC sends the valid data received to the host computer 200 via the dedicated streaming channel "stream{data}".

By means of message AccClose( ), the host computer request the gRPC to release the resources, for example, such that the resources are no longer in use of the configured accelerator and such that the partition configured for that accelerator can be freed.

Figure 8:
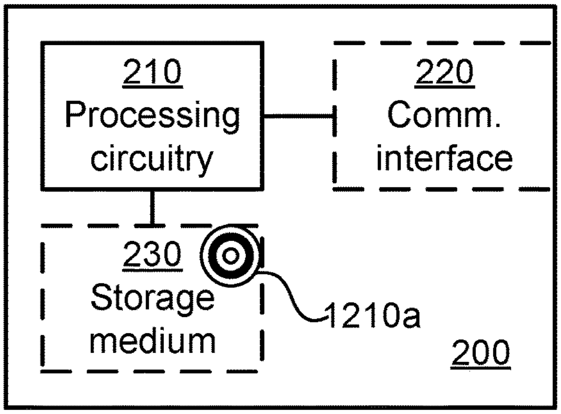
FIG. 8 is a schematic diagram showing functional units of a host computer according to an embodiment.

FIG. 8 schematically illustrates, in terms of a number of functional units, the components of a host computer 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210*a* (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the host computer 200 to perform a set of operations, or steps, as disclosed above. For example, the storage medium 230 may store the set of operations, and the processing circuitry 210 may be configured to retrieve the set of operations from the storage medium 230 to cause the host computer 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The host computer 200 may further comprise a communications interface 220 for communications with the FPGA 300 over the PCIe interface 400. As such the communications interface 220 may comprise one or more transmitters and receivers, comprising analogue and digital components.

The processing circuitry 210 controls the general operation of the host computer 200 e.g. by sending data and control signals to the communications interface 220 and the storage medium 230, by receiving data and reports from the communications interface 220, and by retrieving data and instructions from the storage medium 230. Other components, as well as the related functionality, of the host computer 200 are omitted in order not to obscure the concepts presented herein.

Figure 9:
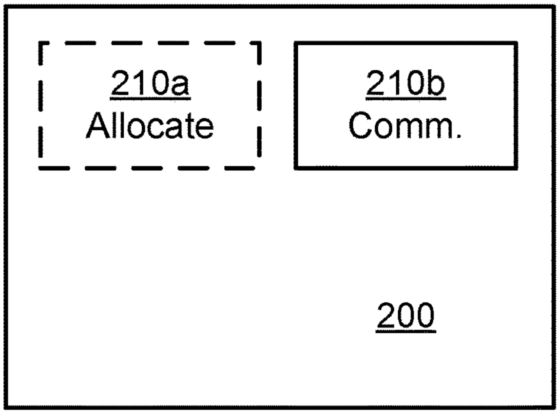
FIG. 9 is a schematic diagram showing functional modules of a host computer according to an embodiment.

FIG. 9 schematically illustrates, in terms of a number of functional modules, the components of a host computer 200 according to an embodiment. The host computer 200 of FIG. 9 comprises a communicate module 210*b* configured to perform step S104. The host computer 200 of FIG. 9 may further comprise a number of optional functional modules, such as an allocate module 210*a* configured to perform step S102. In general terms, each functional module 210*a*-210*b* may be implemented in hardware or in software. Preferably, one or more or all functional modules 210*a*-210*b* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*b* and to execute these instructions, thereby performing any steps of the host computer 200 as disclosed herein.

Figure 10:
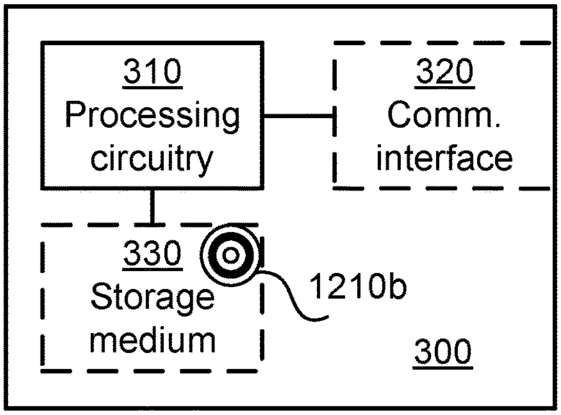
FIG. 10 is a schematic diagram showing functional units of an FPGA according to an embodiment.

FIG. 10 schematically illustrates, in terms of a number of functional units, the components of an FPGA 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 121*ob* (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the FPGA 300 to perform a set of operations, or steps, as disclosed above. For example, the storage medium 330 may store the set of operations, and the processing circuitry 310 may be configured to retrieve the set of operations from the storage medium 330 to cause the FPGA 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The FPGA 300 may further comprise a communications interface 320 for communications with the host computer 200 over the PCIe interface 400. As such the communications interface 320 may comprise one or more transmitters and receivers, comprising analogue and digital components.

The processing circuitry 310 controls the general operation of the FPGA 300 e.g. by sending data and control signals to the communications interface 320 and the storage medium 330, by receiving data and reports from the communications interface 320, and by retrieving data and instructions from the storage medium 330. Other components, as well as the related functionality, of the FPGA 300 are omitted in order not to obscure the concepts presented herein.

Figure 11:
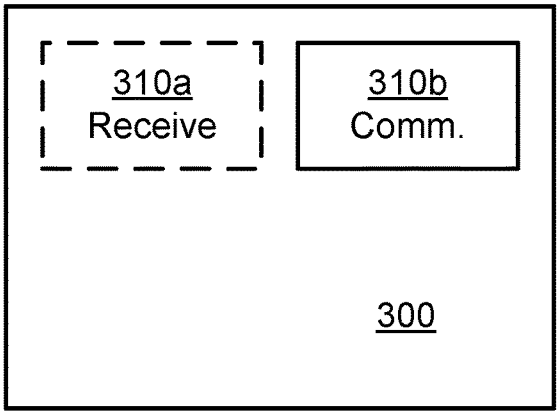
FIG. 11 is a schematic diagram showing functional modules of an FPGA according to an embodiment.

FIG. 11 schematically illustrates, in terms of a number of functional modules, the components of an FPGA 300 according to an embodiment. The FPGA 300 of FIG. 11 comprises a communicate module 310*b* configured to perform step S204. The FPGA 300 of FIG. 11 may further comprise a number of optional functional modules, such as a receive module 310*a* configured to perform step S202. In general terms, each functional module 310*a*-310*b* may be implemented in hardware or in software. Preferably, one or more or all functional modules 310*a*-310*b* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*b* and to execute these instructions, thereby performing any steps of the FPGA 300 as disclosed herein.

Figure 12:
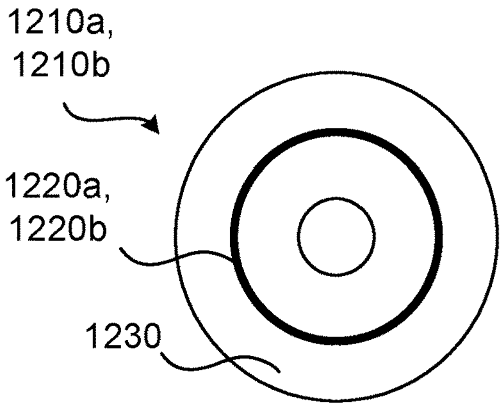
FIG. 12 shows one example of a computer program product comprising computer readable means according to an embodiment.

FIG. 12 shows one example of a computer program product 1210*a*, 1210*b* comprising computer readable means 1230. On this computer readable means 1230, a computer program 1220*a* can be stored, which computer program 1220*a* can cause the processing circuitry 210 and thereto operatively coupled entities and devices, such as the communications interface 220 and the storage medium 230, to execute methods according to embodiments described herein. The computer program 1220*a* and/or computer program product 1210*a* may thus provide means for performing any steps of the host computer 200 as herein disclosed. On this computer readable means 1230, a computer program 1220*b* can be stored, which computer program 1220*b* can cause the processing circuitry 310 and thereto operatively coupled entities and devices, such as the communications interface 320 and the storage medium 330, to execute methods according to embodiments described herein. The computer program 1220*b* and/or computer program product 1210*b* may thus provide means for performing any steps of the FPGA 300 as herein disclosed.

In the example of FIG. 12, the computer program product 1210*a*, 1210*b* is illustrated as an optical disc, such as a CD (compact disc) or a DVD (digital versatile disc) or a Blu-Ray disc. The computer program product 1210*a*, 1210*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220*a*, 1220*b* is here schematically shown as a track on the depicted optical disk, the computer program 1220*a*, 1220*b* can be stored in any way which is suitable for the computer program product 1210*a*, 1210*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for data communication between applications of a host computer and partitions of resources of an FPGA, each partition being configured to serve a respective one of the applications, and the host computer being configured to run the applications, the method being performed by the host computer, the method comprising:
communicating, over a PCIe interface provided between the host computer and the FPGA, data between the applications and the partitions of resources, wherein the communicating comprises:
concatenating data from two or more of the applications into a single fixed-size PCIe data transaction;
writing start and end offsets for the data from each of the two or more applications into a register file, the start and end offsets indicating respective locations of the data within the single fixed-size PCIe data transaction; and
transmitting the single fixed-size PCIe data transaction over the PCIe interface in a data transfer cycle;
wherein each application is allocated its own configured share of bandwidth resources of the PCIe interface, and all bandwidth resources of the PCIe interface are distributed between the applications according to all the configured shares of bandwidth resources when the data is communicated.

2. The method according to claim 1, further comprising:
allocating the bandwidth resources of the PCIe interface to the applications according to the configured shares of bandwidth resources before the data is communicated;
wherein the data, per each data transfer cycle, is either communicated from the host computer to the FPGA or from the FPGA to the host computer.

3. The method according to claim 2, wherein one fixed-size PCIe data transaction is communicated per each data transfer cycle.

4. The method according to claim 3, wherein communicating the data, between the host computer and the FPGA, comprises converting one fixed-size PCIe data transaction per each data transfer cycle into at least two direct memory access requests.

5. The method according to claim 4, wherein the PCIe interface is composed of direct memory access channels, and wherein there are at least as many direct memory access requests as there are direct memory access channels.

6. The method according to claim 5, wherein the at least two direct memory access requests are instantiated in parallel across all the direct memory access channels, and wherein the data is distributed among the direct memory access channels according to the configured shares of bandwidth resources.

7. The method according to claim 2, wherein all bandwidth resources of the PCIe interface, per data transfer cycle, collectively define the fixed-size PCIe data transaction, and wherein each configured share of bandwidth resources is by the host computer translated to read/write offsets within the fixed-size PCIe data transaction.

8. The method according to claim 7, wherein the read/write offsets are communicated from the host computer to the FPGA.

9. The method according to claim 1, wherein the bandwidth resources of the PCIe interface are given in units of 32 bytes per data transfer cycle, and wherein each configured share of bandwidth resources of the PCIe interface is given as a multiple of 32 bytes.

10. A method for data communication between partitions of resources of an FPGA and applications of a host computer, each partition being configured to serve a respective one of the applications, and the host computer being configured to run the applications, the method being performed by the FPGA, the method comprising:

communicating, over a PCIe interface provided between the FPGA and the host computer, data between the applications and the partitions of resources, wherein the communicating comprises:

receiving concatenated data from two or more of the applications into a single fixed-size PCIe data transaction; and receiving the single fixed-size PCIe data transaction over the PCIe interface in a data transfer cycle;

wherein each application is allocated its own configured share of bandwidth resources of the PCIe interface, and all bandwidth resources of the PCIe interface are distributed between the applications according to all the configured shares of bandwidth resources when the data is communicated.

11. The method according to claim 10, wherein one fixed-size PCIe data transaction is communicated per each data transfer cycle.

12. The method according to claim 10, wherein all bandwidth resources of the PCIe interface, per data transfer cycle, collectively define the fixed-size PCIe data transaction, and wherein each configured share of bandwidth resources corresponds to read/write offsets within the fixed-size PCIe data transaction.

13. The method according to claim 12, wherein the read/write offsets are communicated to the FPGA from the host computer and written by the FPGA in a register file.

14. The method according to claim 13, wherein, for data communicated from the host computer to the FPGA, the data is distributed to the partitions according to the write offsets in the register file.

15. The method according to claim 12, wherein, for data communicated from the host computer to the FPGA, the data is reordered according to the write offsets in the register file before being distributed to the partitions.

16. The method according to claim 12, wherein, for data communicated from the FPGA to the host computer, the data is reordered according to the read offsets in the register file before being communicated from the FPGA to the host computer.

17. The method according to claim 10, wherein the FPGA comprises a double buffer, and wherein the data is reordered in a double buffer.

18. The method according to claim 10, wherein the bandwidth resources of the PCIe interface are given in units of 32 bytes per data transfer cycle, and wherein each configured share of bandwidth resources of the PCIe interface is given as a multiple of 32 bytes.

19. A host computer for data communication between applications of the host computer and partitions of resources of an FPGA, each partition being configured to serve a respective one of the applications, and the host computer being configured to run the applications, the host computer comprising processing circuitry, the processing circuitry being configured to cause the host computer to:

communicate, over a PCIe interface provided between the host computer and the FPGA, data between the applications and the partitions of resources, wherein the communicating comprises the processing circuitry being further configured to cause the host computer to:

concatenate data from two or more of the applications into a single fixed-size PCIe data transaction;

write start and end offsets for the data from each of the two or more applications into a register file, the start and end offsets indicating respective locations of the data within the single fixed-size PCIe data transaction; and transmit the single fixed-size PCIe data transaction over the PCIe interface in a data transfer cycle;

wherein each application is allocated its own configured share of bandwidth resources of the PCIe interface, and all bandwidth resources of the PCIe interface are distributed between the applications according to all the configured shares of bandwidth resources when the data is communicated.

20. An FPGA for data communication between partitions of resources of the FPGA and applications of a host computer, each partition being configured to serve a respective one of the applications, and the host computer being configured to run the applications, the FPGA comprising processing circuitry, the processing circuitry being configured to cause the FPGA to:

communicate, over a PCIe interface provided between the FPGA and the host computer, data between the applications and the partitions of resources, wherein the communicating comprises the processing circuitry being further configured to cause the FPGA to:

receiving concatenated data from two or more of the applications into a single fixed-size PCIe data transaction; and receiving the single fixed-size PCIe data transaction over the PCIe interface in a data transfer cycle;

wherein each application is allocated its own configured share of bandwidth resources of the PCIe interface, and all bandwidth resources of the PCIe interface are distributed between the applications according to all the configured shares of bandwidth resources when the data is communicated.

* * * * *